June 25, 1946.	D. H. BUCKS	2,402,730
FISHHOOK
Filed Jan. 24, 1945
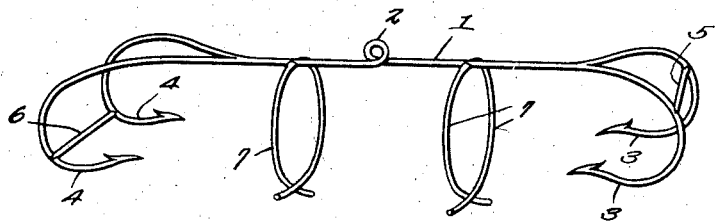
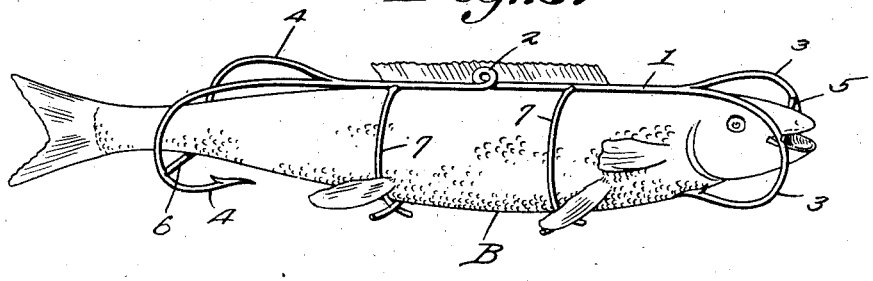
D. H. Bucks
INVENTOR.

Patented June 25, 1946

2,402,730

UNITED STATES PATENT OFFICE 2,402,730

FISHHOOK

David Hiram Bucks, Milwaukee, Wis.

Application January 24, 1945, Serial No. 574,297

1 Claim. (Cl. 43—40)

This invention relates to fish hooks, an object being to combine with a fish hook of the twin or forked type, a means whereby suitable live bait, such as a minnow, can be held securely in position close to the prongs of the fish hook.

A further object is to provide the device with means for engaging the tail portion and the mouth portion of the bait so that the bait is unable to detach itself after being placed in the water.

A still further object is to provide means for embracing the bait at intermediate points.

With the foregoing and other objects in view which will appear as the description proceeds, the invention consists of certain novel details of construction and combination of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1 is a perspective view of the fish hook.

Figure 2 is a similar view from the same position with a minnow used for live bait.

Referring to the figures by characters of reference 1 designates the main wire of the fish hook which, in the present instance, is formed with a centrally located eye while both ends are forked or bent to provide spaced hooks forming pairs 3 and 4 respectively. The hooks comprising the pair 3 are joined by transverse pin 5 welded or otherwise joined thereto and forming a mouth piece while the hooks forming the other pair 4 are joined by a pin 6 constituting a tail support.

At intermediate points the wire 1 has spring clips 7 joined thereto, each of these clips being formed of opposed arcuate spring wires the free end portions of which are closed normally as shown in Fig. 1. The clips are disposed in planes at right angles to the wire 1 and are located where they will embrace and grip the portions of the body of the bait B.

In practice the minnow is positioned within the clips 7 with the pin 5 fitted firmly in the mouth of the bait while the tail portion is supported on the pin 6. The clips 7 will be arranged directly back of the fins of the minnow which thus cooperate with the clips to prevent the minnow from working backwardly a distance sufficient to enable it to withdraw its mouth from pin 5. This backward movement is further resisted by the gripping action of the clips 7 upon the bait.

The fishing line is to be attached to the eye 2 in the same manner as any other type of hook but as the present structure is substantially balanced when the bait is in position, the bait will be supported in a natural position in the water.

By providing opposed twin hooks, the possibility of a fish breaking loose after once being snared is practically eliminated.

What is claimed is:

A fish hook including a wire having line engaging means at an intermediate point, opposed pairs of diverging hooks integral with the wire, said pairs having their points extended toward each other, a mouth pin connecting the hooks of one pair, a tail supporting pin connecting the hooks of the other pair, and a spring clip integral with the wire and between the hooks.

DAVID HIRAM BUCKS.